D. C. KELLAM.

Pipe-Coupling.

No. 126,553.                              Patented May 7, 1872.

Witnesses.                                Inventor.
H. H. Young                               Daniel C. Kellam
Ewell A. Dick.

126,553

UNITED STATES PATENT OFFICE.

DANIEL C. KELLAM, OF PONTIAC, MICHIGAN.

IMPROVEMENT IN PIPE-COUPLINGS.

Specification forming part of Letters Patent No. 126,553, dated May 7, 1872.

*To all whom it may concern:*

Be it known that I, DANIEL C. KELLAM, of Pontiac, in the county of Oakland and State of Michigan, have invented certain new and useful Improvements in Couplings for Water and Steam Pipes; and I do hereby declare that the following is a full, clear, and exact description of the same, reference being had to the accompanying drawing which makes part of this specification, and in which—

Figure 1:
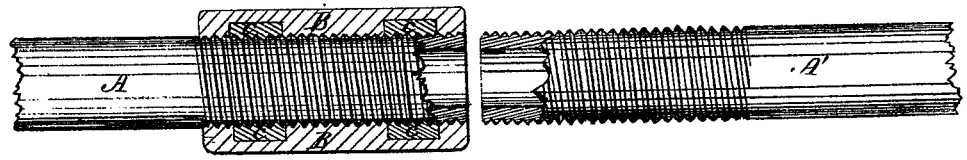
Figure 2:
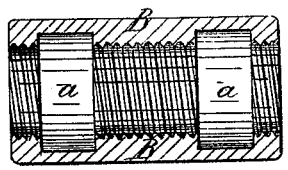

Figure 1 represents a longitudinal sectional view of the coupling-sleeve, carried up on the threads of one of the sections of pipe to show the manner of detaching the contiguous section of pipe when desired. Fig. 2 is a similar view of the coupling detached from the sections of pipe to more clearly show its construction, the same consisting of an annular chamber at either end of said coupling to receive the packing.

The nature of my invention consists in providing the coupling-sleeve or nut with a chamber at each end, of an inner diameter greater than the outer diameter of the sections of pipe to be connected, which chambers are filled with an annular ring of rubber, leather, or other suitable material, the inner diameter of which is a little less than the outer diameter of said sections of pipe, so that the latter in being screwed through the packing to an intermediate point of contact or union, will press the packing closely within its chambers, where it is held securely by the combined action of the shoulders of said chambers and by the threads on the sections of pipe, as will be hereinafter described.

In the accompanying drawing, A A' represent contiguous sections of pipe, which are to be united by the coupling B. In Fig. 1, however, the said coupling B is carried up on the threads of the section A, to show the manner of detaching the contiguous section A' when desired, or vice versa; and it is seen that each of the sections is provided with a sufficient length of thread to enable this to be done, and by a like construction of their opposite ends, any portion of a pipe may be removed when desired; and a special advantage of my invention is that while one section of the pipe can be removed, the packing around the contiguous section is not moved or affected in any manner whatever. It will be further seen that a continuous thread is formed on the sections of pipe of sufficient length to receive the coupling-sleeve on either one of the sections, as may be desired. The coupling B for uniting the sections of pipe is provided at either end with a chamber, *a*, of a diameter a little greater than the inner diameter of said coupling, into which an annular ring or packing, *c*, of leather, rubber, or other suitable material is inserted, which ring or packing protrudes slightly beyond the interior of the coupling, so that when said coupling is screwed on the sections of pipe A A' until they meet at an intermediate point, the threads on said sections passing through the packing, press it into every part of said chambers, where it is securely held by the combined action of said threads and the shoulders formed by said chambers.

It will thus be seen that a perfect water-tight joint is made between the sections of pipe, a joint which is superior to that ordinarily made where end packing is employed, because of the liability of the latter to become loose, an objection which has always been urged against couplings of this construction. A coupling constructed as mine is, cannot become loose or leaky as long as the sections of pipe are within it.

It will be understood that my invention can likewise be applied to the connection of gas-pipes; but as it is proposed to file a separate application for Letters Patent covering this use, no further mention need be made of it here.

Having described my invention, I claim—

A coupling, B, for water and steam pipes, provided at each end with an annular chamber, *a*, to receive an annular ring or packing, *c*, of leather, rubber, or other suitable material, which packings are pressed within said chambers by the screw-threads of the sections of pipe to be united passing through them, and held firmly therein by the combined action of the threads and the shoulders of the chambers, substantially as herein described.

In testimony whereof I have hereunto signed my name.

DANIEL C. KELLAM.

Witnesses:
EWELL A. DICK,
H. H. YOUNG.